United States Patent

[11] 3,565,238

| | | |
|---|---|---|
| [72] | Inventor | Basil J. Candela<br>454 Westchester Ave., Yonkers, N.Y. 10707 |
| [21] | Appl. No. | 726,878 |
| [22] | Filed | May 6, 1968 |
| [45] | Patented | Feb. 23, 1971 |

[54] VARIABLE-VELOCITY CONVEYOR
23 Claims, 9 Drawing Figs.

[52] U.S. Cl. .................................................. 198/110, 104/25
[51] Int. Cl. .................................................. B65b 9/12, B65g 21/12
[50] Field of Search .................................................. 198/18, 110; 104/20, 25

[56] References Cited
UNITED STATES PATENTS
639,154  12/1899  Dodge .................... 198/18
651,241  6/1900  Dodge .................... 198/18
3,462,002  8/1969  Zuppiger .................... 198/110

*Primary Examiner*—Edward A. Sroka
*Attorney*—Kenyon & Kenyon, Reilly, Carr & Chapin ABSTRACT: The conveyor is of a continuous type and has tracks which cause the conveying mechanism which has the capability of varying its horizontal length to accelerate or decelerate in passing through the transition zones. The belt is payed out or withdrawn during movement in the transition zones to compensate for the difference in speed between adjacent repeating sections so that a continuous floor is maintained. The conveyor can be laid out in only a horizontal plane or can also be laid out with escalator sections as well as horizontal sections to change elevation as function demands.

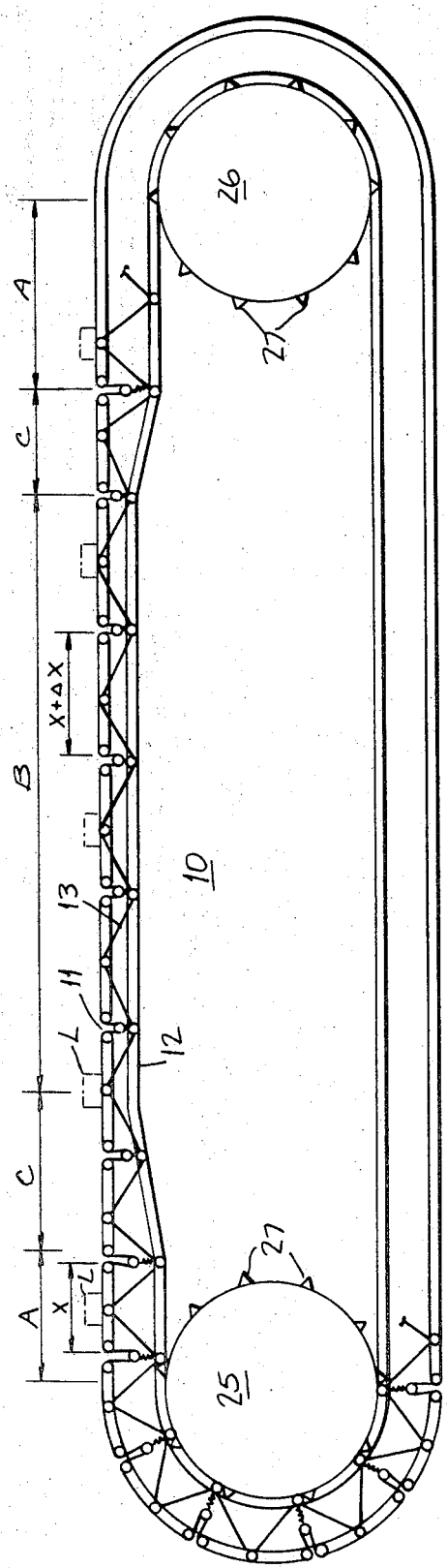
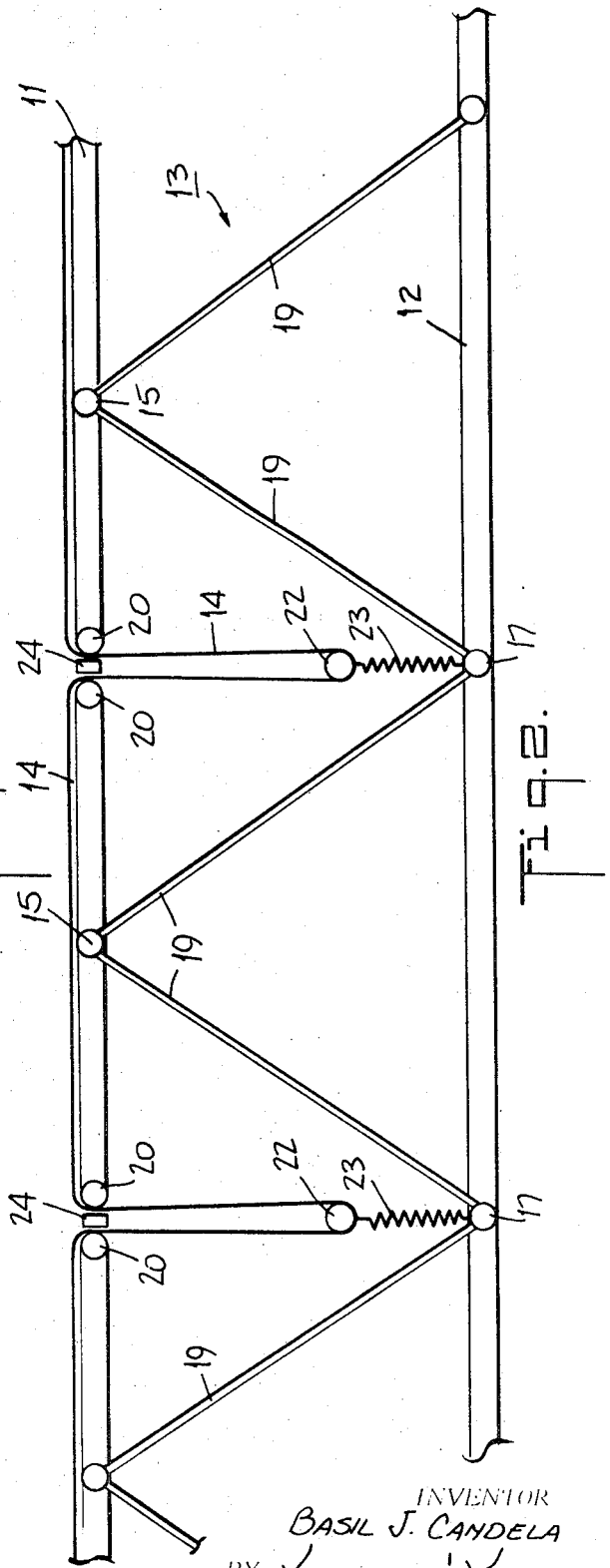

INVENTOR.
BASIL J. CANDELA
BY Kenyon & Kenyon
ATTORNEYS

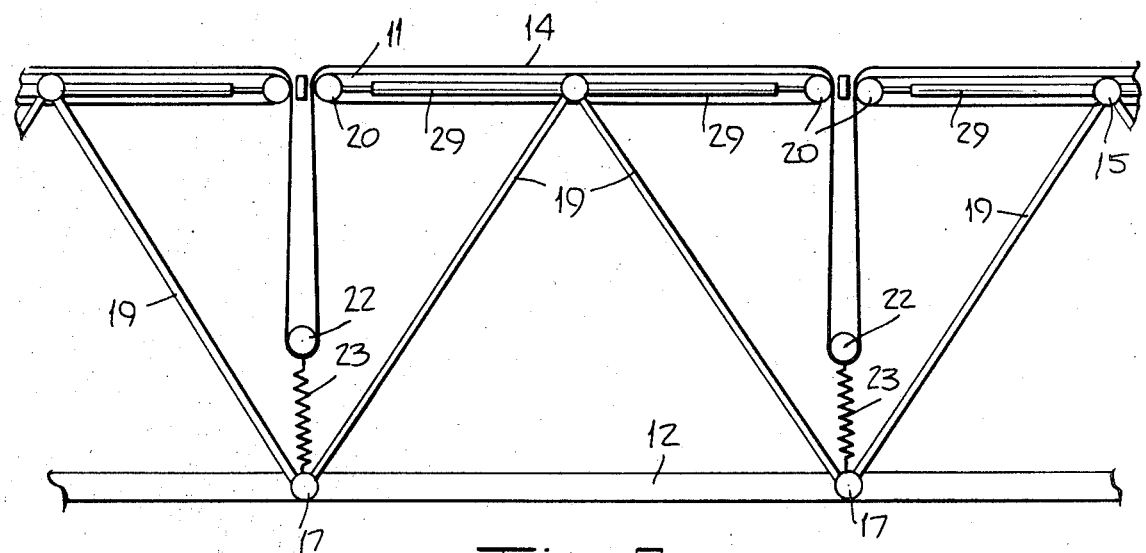
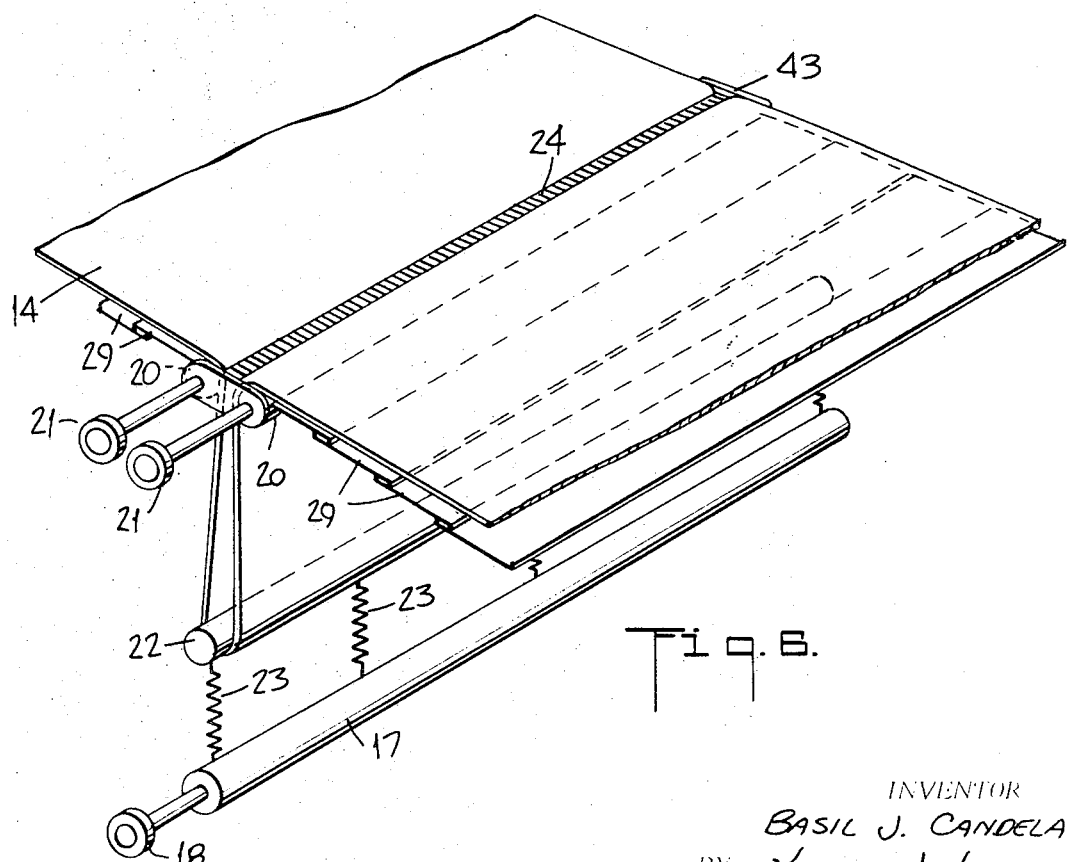

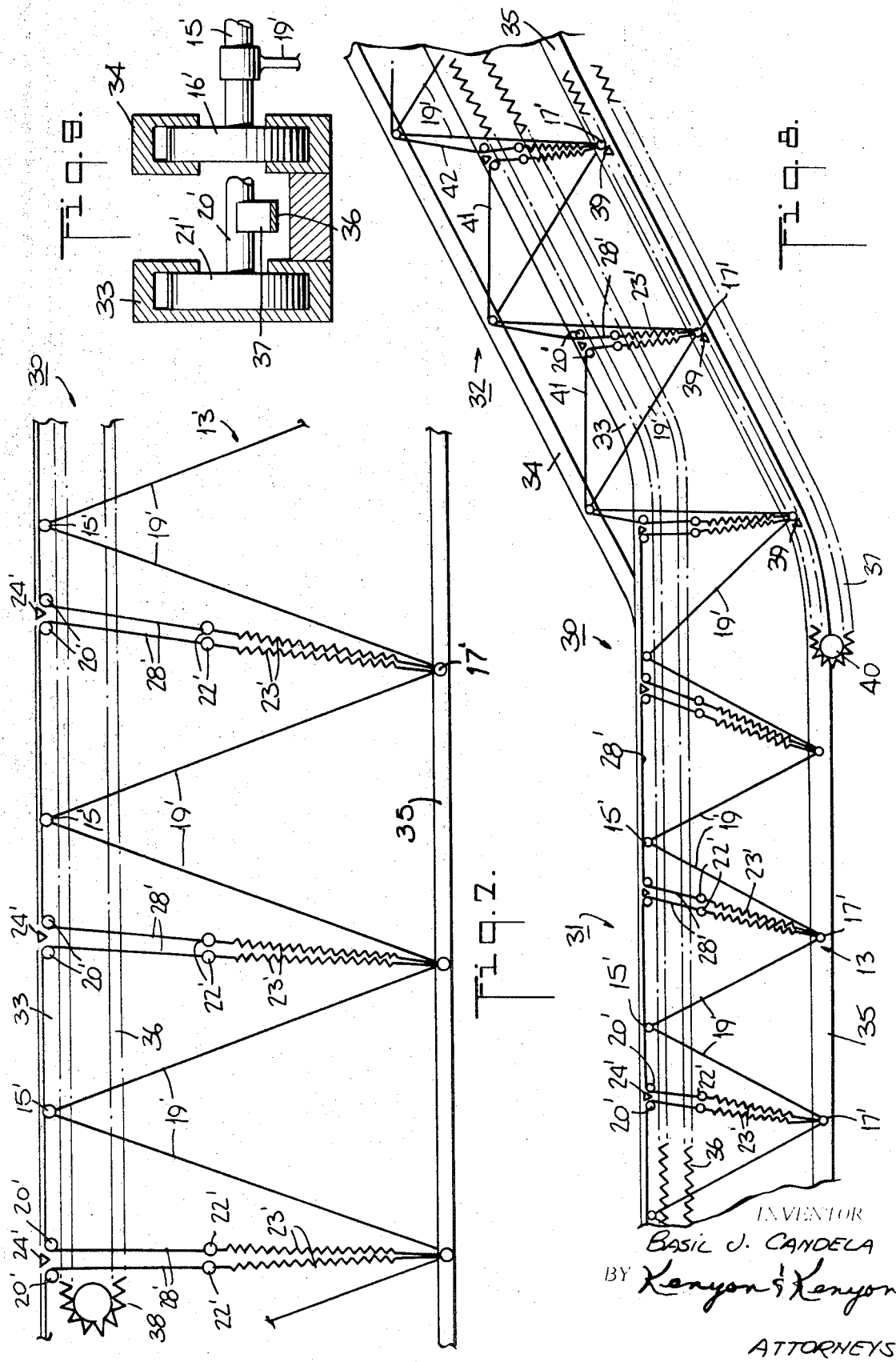

VARIABLE-VELOCITY CONVEYOR

This invention relates to a variable-velocity conveyor. More particularly, this invention relates to a variable-velocity conveyor having smooth acceleration and deceleration zones for changing the speed of a conveyed load. This invention also relates to a continuous conveyor having an escalator section.

In order to move goods or passengers in bulk from one station to another in an efficient manner, various types of mechanized conveyor systems have been used. Generally, these conveyor systems have been operated to move an endless belt or other type of continuous floor in a continuous manner such that the goods or passengers need only be placed upon the belt at one station in order to be automatically transported to the other station. However, since the endless belts or floors have usually been in motion during placement and removal of the goods or passengers, the goods or passengers have experienced a sudden change in velocity in moving onto and off the belts or floors. Such a change in velocity, if small, may not be damaging to goods or passengers but if large such abruptness in the change of velocity may cause damage to the goods and in those instances where passengers are conveyed, such may cause the passengers to momentarily lose their balance while also being otherwise discomforting.

In order to avoid an abrupt change in velocity in placing or removing a load from a moving conveyor, various acceleration and deceleration devices have been used so as to impart a smooth transition in moving onto or off the conveyor. However, the devices which have been used to facilitate the transition in load speed have not been economical or convenient. For example, in some instances, a series of individual conveyors have been oriented in the path of travel of a load to move the load in a series of steps each of which moves the load at a different constant speed. In this manner, the load starts out at a slow constant speed on one conveyor and advances onto the next conveyor to be carried at a faster constant speed. The load is thereafter slowed in an opposite fashion at the end of the conveyor series so as to be removed. In other instances, a series of aligned conveyor units having retractable belts have been used to convey a load at an increasing or a decreasing speed within the limits of each conveyor unit so as to convey a load in a progressive stepwise manner. These heretofore known devices however, require a number of individually operated conveyors or units which must be synchronized in order to effect as smooth as possible a transition from one conveyor or unit to the next. Also, such devices require a large volume for operation and also, in many instances, require movement of the load from one conveyor to the next.

In those situations where it is desired to move passengers at a high speed between stations, conveyor systems have been proposed wherein a first belt traveling at a slow speed is used to initially pick up and convey a passenger to a second belt traveling at the desired high speed. A third belt at the opposite end of the high-speed belt is operated in similar manner to the first belt to decelerate the speed of the passenger for debarking. However, such systems still cause an abrupt change in speed as the passenger moves from one belt to another where the respective belt speeds are substantially different. Also, such systems require the passenger to step from one belt to the next. This not only is inconvenient to the passenger but also can be a cause of injury to the passenger, especially, in the event that the conveyor system is crowded and the passenger is inattentive to his position on the system.

Additionally, many of the conveyors which have been used to convey a load have directed the load in a substantially horizontal plane or in a slight inclined plane depending on the relative coefficients of friction of the load on the conveyor. Thus, where a load requires a substantial movement from one horizontal plane to another, the inclined conveyors have either been greatly lengthened to obtain the required difference in elevation or have relied on a separate escalator mechanism to elevate the load. In the first of these alternatives, the greater lengths of the conveyors has frequently been prohibitive due to a lack of space. Also, the greater length has required more material and working parts with consequent increases in cost. In the latter of the above alternatives, the separate escalator systems have required synchronizing mechanisms to synchronize the movements of the conveyors to the escalator systems.

Accordingly, it is an object of the invention to provide a conveyor which is able to convey a load in a continuous manner at variable speed without movement of the load from one position on the conveyor to another.

It is another object of the invention to continuously convey a load at a variable speed from one elevation to another.

It is another object of the invention to place a load on a conveyor moving at a slow speed at point of placement and to accelerate the load on the conveyor.

It is another object of the invention to effect a smooth transition in placing and removing a load on a conveyor for moving the load from one station to another.

It is another object of the invention to move a passenger from one station to another station at a different elevation on a continuous conveyor.

It is another object of the invention to provide a conveyor which is capable of moving a load at variable speeds and through changes in elevation while maintaining the load in a fixed position on the conveyor.

It is another object of the invention to provide an economical conveyor of compact size for moving a passenger or other load at variable speeds.

Briefly, the invention provides a conveyor system which is capable of moving a passenger or other load in a smooth continuous manner from one station to another station. The conveyor system operates in a manner to receive a load at one station at a relatively low speed, accelerates smoothly at a high speed to quickly transport the load and decelerates smoothly to allow removal of the load at the other station.

In one embodiment, the conveyor system includes a conveyor of endless loop construction having pairs of spaced guide tracks formed into an endless loop, a conveying mechanism mounted in the guide tracks upon which a load is conveyed and one or more drive means for driving the conveying mechanism in the guide tracks.

The guide tracks include a pair of horizontally spaced upper guide tracks and a pair of similarly spaced lower guide tracks. These tracks are arranged in an endless loop in concentric relation to each other with the lower guide tracks to the inside of the upper guide tracks in order to guide the conveyor mechanism in an endless path between two or more stations. In addition, the tracks are arranged to define a conveying section on the upper reach of the endless loop having an intermediate convergent zone and a pair of divergent end zones. The tracks in the convergent zone are parallel as in the divergent zone but are spaced closer together than in the divergent zone while the lower tracks are sloped in the areas between the convergent and divergent zones to provide smooth transition zones. The tracks may also define a return section in the lower reach of the endless loop for recirculating the conveyor mechanism through the conveying section as shown in the diagrams herein or may define a return section alongside the conveyor mechanism providing a two-way conveyor capability between stations.

The conveying mechanism is composed of a roller mounted scaffoldlike structure and a flexible belt which is supported over the scaffoldlike structure to receive and support a load thereon. The scaffoldlike structure is made up of repeating vertically collapsible sections and is mounted in the upper and lower guide tracks for movement through the endless path defined by the tracks. Each of the repeating sections of the conveying mechanism includes an upper track rod and a pair of belt guides movably mounted across the upper guide tracks. In addition, each repeating section includes a pair of hypothenuse members on each side, each of which is connected between the upper track rod and a lower track rod, and either a single belt-retaining rod or a pair of belt-retaining rods which are spring mounted to and above the lower track rods. The flexible belt passes under the single belt-retaining rod in a continuous manner or when a pair of belt-retaining rods is used is connected to the belt-retaining rods and is mounted over the belt guides and upper track rod in the upper guide tracks. The upper and lower track rods are provided with suitable rollers at their ends to facilitate movement of the track rods in the respective guide tracks. Likewise, the belt guides are provided with rollers to facilitate movement in the upper guide tracks. The hypothenuse members are of fixed equal lengths and are pivotally mounted to the respective track rods so as to pivot relative to the upper guide tracks upon passing through the transition zones of the guide tracks. The belt guides are mounted to either side of the upper track rod. If the belt material is strong enough to support the load safely between the upper track rods and the belt guides as may be the case if the belt material is made of hinged metal plate, then no support may be required between upper track rods and belt guides. If the belt material is not strong enough to support the load safely, the belt guides are to be connected to the upper track rod by telescoping rods or plates so as to be freely movable. During use, these belt guides tend to locate above the retaining rods so that the flexible belt and hypothenuse members tend to form a pair of right triangles. The belt retaining rods serve to tension the flexible belt between the belt guides so as to provide a flattened floor for receiving the load to be conveyed. In addition, the belt-retaining rods take up and let out the flexible belt as the conveyor mechanism passes through the transition zones of the guide tracks.

The drive means for the conveying system includes at least one drum, but may include as many as may be necessary for the length of the conveyor, weight of the conveyed material and the structural limitations of the system. The drums are located to engage the bottom horizontal track rod and move the conveying mechanism along the tracks. In addition, the drive means includes a suitable motor or motors connected to the drums for rotating the drums at a constant speed.

In operation, with the conveying mechanism being driven, a load is placed on the conveying mechanism on the belt of one of the repeating sections at a station within a divergent zone of the guide tracks. At this station, the belts of adjacent repeating sections form a substantially continuous floor surface and are moved at a relatively low speed. As the conveying mechanism continues to move along the guide tracks, the conveying mechanism and load pass into the adjacent transition zone and become accelerated. This acceleration is effected by gradually decreasing the distance between the lower tracks and the upper tracks. This causes the conveying mechanism to, in a sense, be compressed in a vertical plane while becoming elongated in a horizontal plane. The upper track rods thus are forced apart gradually as are the lower track rods. A similar analogy can be drawn with a flow of liquid through a pipe having a narrowed diameter section. During this transition in speed the flexible belt is let out by the spring-loaded retaining rods over the belt guides so as to prevent spaces from occurring between successive repeating sections.

Upon passing into the convergent zone, the acceleration of the conveying mechanism ceases and the load is then carried at a constant high velocity to the next transition zone. In this latter transition zone, the conveying mechanism is decelerated in a reverse manner to that described above for acceleration in order to achieve a speed suitable for removal of the load from the conveying mechanism at a debarking station within the divergent zone at the end of the upper reach of the conveyor system. This entire process may be repeated as many times as desirable, effecting a capability similar to a "local" train with several points of embarkation and debarkation.

After reaching the end of the conveyor, the conveying mechanism is recirculated back to the beginning. The conveyor mechanism can be made to turn in the horizontal plane to provide a return belt capability or can be made to turn in the vertical plane and double back beneath itself in a continuous loop. In this latter case, the upper and lower guide tracks in the lower reach of the conveyor can be positioned as close as possible together vertically depending upon the limitations of the conveying mechanism in order to return the conveying mechanism at a high speed.

In another embodiment, the conveyor system is adapted to convey a load from one horizontal plane to another horizontal plane. In this embodiment, the conveyor system includes a conveyor of the endless loop type having three pairs of spaced guide tracks forming an endless loop including a horizontal segment and an inclined segment, a conveying mechanism as above and a drive means for driving the conveying mechanism in the horizontal and inclined segments.

The guide tracks include two pairs of guide tracks as above for guiding the conveying mechanism through various zones and segments of the conveyor. In addition, a third pair of guide tracks is provided to guide the belt guides independently of the upper track rod. This third pair of guide tracks is disposed in parallel relation to and in the same plane as the upper guide tracks within the horizontal segment of the conveyor. However, in the inclined segment, this third pair of guide tracks diverges from the upper guide tracks to become disposed in parallel between the upper and lower guide tracks. The relation of these three pairs of guide tracks is such as to have the conveying mechanism form a series of steps within the inclined segment of the conveyor. For example, with the conveying mechanism moving in an upward direction, each of these steps if formed by having the forward belt guide and the upper track rod of each repeating section positioned in the same horizontal plane by the respective guide tracks so that the flexible belt lies in a horizontal plane between this belt guide and upper track rod. The remainder of the flexible belt between the belt guides lies in an inclined plane between the upper track rod and rear belt guide.

The drive means, in addition to a pair of rollers as above, includes one endless chain belt disposed adjacent the upper reach of the guide tracks for the belt guides and a second endless chain belt adjacent the upper reach of the lower guide tracks. The first chain is positioned to engage and drive the belt guides at a higher speed than the remainder of the conveying mechanism from a point in the horizontal segment up to the start of the inclined segment. The second chain is positioned to engage and drive the lower track rods at the same speed as the belt guides through the inclined segment.

Where the flexible belt or other suitable flooring is used which is not capable of entirely supporting the load, telescoping plates or bars can be connected between the upper track rod and belt guides to facilitate the supporting of the load.

These and other objects and advantages of the invention will become more apparent from the following detailed description and appended claims taken in conjunction with the accompanying drawings in which:

FIG. 1 illustrates a side view of a conveyor system according to the invention;

FIG. 2 illustrates a fragmentary view of the guide tracks and conveying mechanism of the conveyor system of FIG. 1;

FIG. 5 illustrates a fragmentary view of a modified conveying mechanism having telescoping plates between the belt guides and upper track rod;

FIG. 6 illustrates a perspective fragmentary view of the conveying mechanism of FIG. 5;

FIG. 7 illustrates a fragmentary view of a modified conveyor system according to the invention having a horizontal segment and an inclined segment;

FIG. 8 illustrates an enlarged perspective view of the horizontal segment of the conveyor system of FIG. 7; and FIG. 9 illustrates a partial cross-sectional view of the upper guide tracks in the horizontal segment of the conveyor system of FIG. 7.

Referring to FIG. 1, the conveyor system includes a conveyor 10 of endless loop construction disposed in a horizontal plane. The conveyor 10 has a pair of upper guide tracks 11 and a pair of lower guide tracks 12, only one of each being shown for simplicity. The upper and lower guide tracks 11, 12 are fixedly spaced apart in substantially concentric relation to define an endless path having a pair of divergent zones A at the ends of the upper reach of the conveyor. In addition, the endless path has an intermediate convergent zone B wherein the lower guide tracks 12 are spaced closer to the upper guide tracks 11 and a pair of transition zones C wherein the lower guide tracks 12 slope to join the divergent and convergent zones. The remaining sections of the guide tracks are spaced in parallel relation to each other to define the return section in the lower reach of the conveyor.

Figure 3:
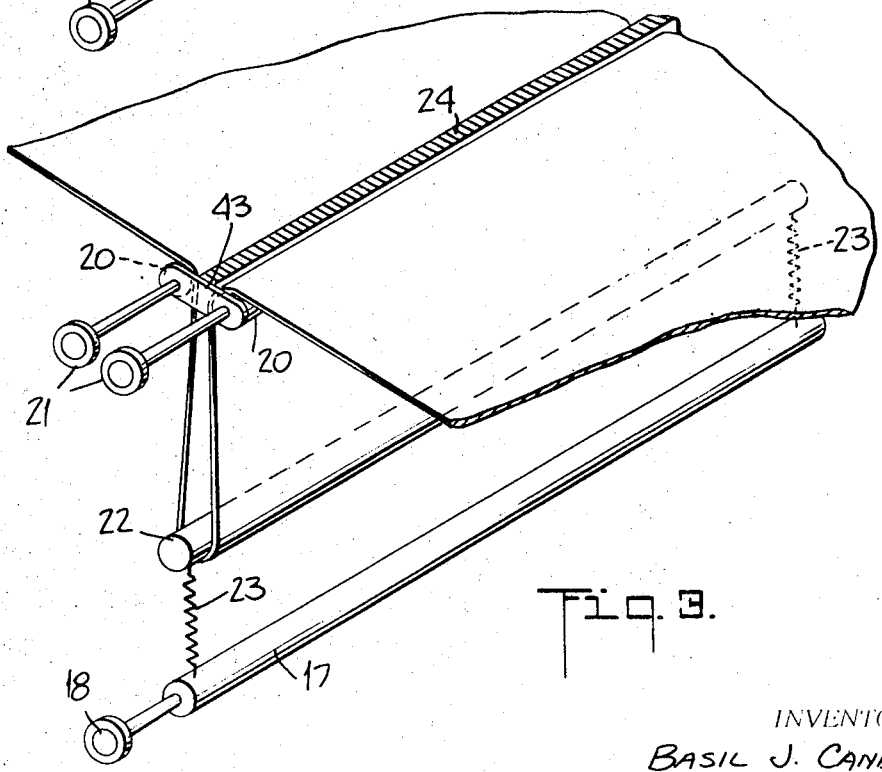
FIG. 3 illustrates a perspective view of a connection of the flexible belt to a retaining rod according to the invention.

Referring to FIGS. 1, 2 and 3, the conveyor also includes a conveying mechanism 13 which is mounted in the guide tracks 11, 12 for movement through the endless path defined by the guide tracks 11, 12. The conveying mechanism 13 completely fills the endless path defined by the guide tracks 11, 12 and is constructed of a scaffoldlike structure made up of a series of connected repeating sections which carry a continuous flexible belt 14. Each repeating section (see FIG. 2) includes an upper track rod 15 having rotatably mounted rollers 16 on the ends which ride in the respective upper guide tracks 11. In addition, each repeating section includes a pair of lower track rods 17 similar to the upper track rod 15 which have rollers 18 mounted on the ends and which have the respective rollers 18 riding in the lower guide tracks 12. A pair of hypothenuse rods 19 are pivotally secured to and between the upper track rod and each of the lower track rods 17 to form a triangular shape. The hypothenuse rods 19 are of fixed length so as to rigidly maintain the lower tracks rods 17 of each repeating section apart. A pair of belt guides 20 in the form of rods having rollers 21 mounted on the ends are also mounted across the upper guide track 11 on opposite sides of the upper track rod 15 in a free manner to guide the belt 14 from a horizontal plane to a vertical plane. A pair of belt-retaining rods 22 are disposed to opposite sides of the upper track rod 15 and are positioned across the top surface of the belt 14 in a manner to form the belt 14 into a loop between adjacent repeating sections. Each belt-retaining rod 22 (FIG. 3) is secured at each end by a spring 23 to a lower track rod 17 under a biasing force which tends to urge the belt-retaining rod 22 towards the lower track rod 17. This biasing force also serves to maintain the flexible belt 14 in a taut condition between the belt guides 20 of each repeating section.

Each set of belt guides 20 and debris trapping wedge or comb 24 are held in proper position and relation to each other by a plate 43 at each end of the assembly just beyond the belt material such that the space between belt guides and wedge or comb will admit belt material in a smooth manner. These combs 24 are of any suitable structure to protect against intrusion of any foreign implement or matter between the horizontal stretches of belt 14. Thus, the scaffoldlike structure carries the flexible belt 14 in a continuous undulating fashion wherein the belt is formed into a series of flat horizontal stretches over each repeating section and depending loops between adjacent repeating sections.

Referring again to FIG. 1, a pair of drive rollers or drums 25, 26 are rotatably mounted at the respective ends of the loop formed by the guide tracks 11, 12. Each drive roller has a plurality of equispaced radially directed pushers 27 for engaging the lower track rods 17 and driving the conveying mechanism 13 along the guide tracks 11, 12. Each of these drive rollers 25, 26 is directly driven by a motor (not shown) to cause the conveying mechanism 12 to move.

In operation, referring to FIG. 1, with the drive rollers 25, 26 driving the conveying mechanism 13 in clockwise manner, a load L is placed on the conveying mechanism 13 within the divergent zone A at the left as viewed. The load is received on the horizontal stretch of belt 14 between the belt guides 20 of a repeating section which is of a length X. In order to facilitate the understanding of the conveying operation, the load L is shown in dashed lines at various positions along the conveyor. As the conveying mechanism 13 continues to move in the guide tracks 11, 12, the forward lower track rod 17 of the repeating section carrying the load L reaches the transition zone C and starts to ride up the inclined lower guide tracks 12 with increasing velocity. This also causes the belt guide 20 above the rising lower track rod 17 to move away from the upper track rod 15 of the repeating section at increasing velocity. The increase in velocity, or acceleration, of the forward belt guide 20 depends upon the rate of convergence of the lower track rod 12 to the horizontal upper track rod 11 such that, the steeper the angle of track incline, the greater the acceleration. At the same time as the forward belt guide 20 is moving away from the upper track rod 15, the forward belt-retaining rod 22 varies its distance to the upper guide track 11 and the springs 23 are compensating for the variation. This allows the flexible belt in the loop to be let out so that the length of the horizontal stretch of the belt on which the load is resting increases to compensate for the acceleration of the belt guide away from the upper track rod.

Continued movement of the conveying mechanism 13 through the left transition zone C causes the upper track rod under the load L to accelerate due to the entry of the rear lower track rod 17 into the transition zone and the consequent tendency of the rear hypothenuse rod 19 to assume a horizontal position. The flattening out of the triangular shape defined by the hypothenuse rods 19 continues through the remainder of the transition zone C with the result that the repeating section and the load L thereon are accelerated.

Upon reaching the convergent zone B, the forward lower track rod 17 ceases to accelerate and travels at a constant high velocity through the remainder of the convergent zone B. Likewise, as the rear lower track rod 17 enters the convergent zone B, acceleration ceases. This also causes the repeating section of the load L thereon to assume the same high velocity through the convergent zone B. During passage through this convergent zone B, the belt guides will have achieved the maximum spacing apart so that the horizontal stretch of belt carrying the load has an increased length of $X + \Delta X$.

The continued movement of the conveying mechanism 13 through the transition zone C into convergent zone A at the right of FIG. 1 is the reverse of that described above and need not be further described. Upon movement into the convergent zone A the load L is removed from the now slowly moving conveying mechanism 13. Thereafter, the conveying mechanism 13 is recirculated as shown through the return section of the lower reach of the conveyor.

In this way, a load L can be moved from one station to another at a relatively high overall speed with a gradual acceleration and deceleration near the respective stations. Depending upon the load being carried, the change in velocity of the load can be made faster or slower by varying the angle of the lower guide tracks in the respective transition zones C. Further, depending on the geometry of the repeating sections and the spacing between the upper and lower guide tracks, the velocity of a load can be increased a great amount.

It is noted that the guide tracks of the conveyor in each of the transition zones can be positioned with respect to one another so as to provide a constant or variable acceleration. For example, with the upper guide tracks remaining horizontal, in order to provide a constant acceleration, the lower guide tracks are sloped on a constant slope or angle. In order to provide a variable change in acceleration, the lower guide tracks are contoured in a curvilinear path. Such curvilinear paths can include a pair of gently curved end sections of opposite sign about an intermediate section of sharp slope, or any other suitable paths.

During the movement of the conveying mechanism 13 through the conveyor loop, the belt 14 is maintained taut by the springs 23. In order to effect this, the springs 23 elongate and contract with the movements of the lower guide rods 17 in the lower guide tracks 12; the maximum elongation occurring when the hypothenuse rods are at a 45° angle with respect to the upper guide tracks 11.

Figure 4:
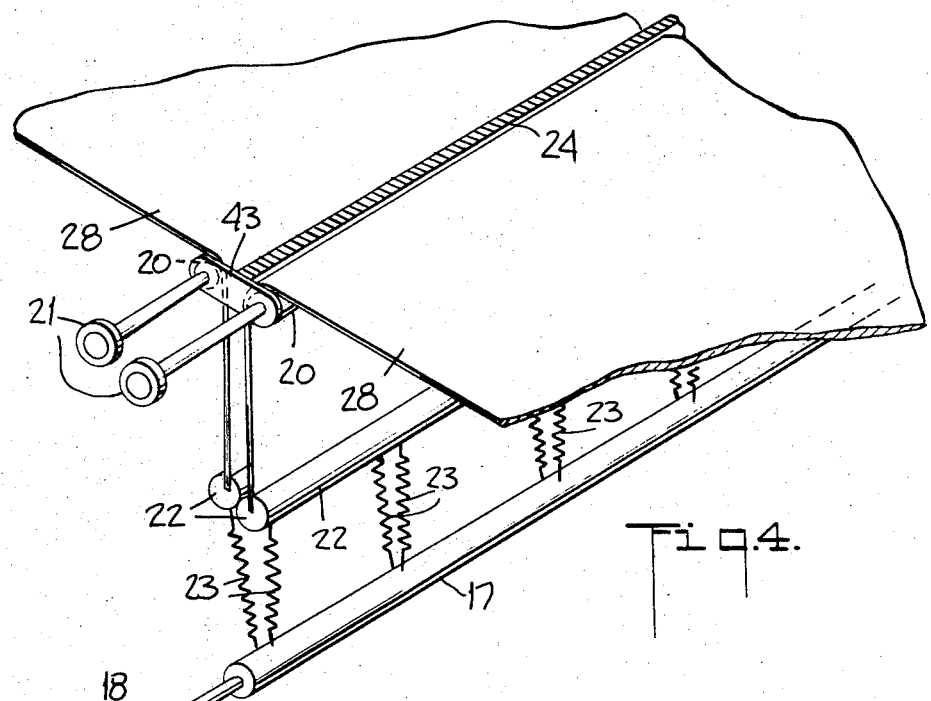
FIG. 4 illustrates a perspective view of a modified connection of a pair of flexible belts to individual retaining rods according to the invention.

Referring to FIG. 4, wherein like reference numerals refer to like parts above, instead of using a single belt of great length, separate lengths of belts 28 can be used. In such a modification, adjacent repeating sections use separate belt-retaining rods 22 to hold the belt lengths rather than a common belt-retaining rod as above. Also, each length of belt 28 is sized to be secured to and to extend from one belt-retaining rod 22 to the other in each repeating section. Further, each belt-retaining rod 22 is secured by a plurality of springs 23 spaced along the lengths of the rods 22 to a common lower track rod 17 positioned below adjacent pairs of belt-retaining rods 22.

Referring to FIGS. 5 and 6, in the event that the flexible belt is not capable of fully supporting a conveyed load, a plurality of telescoping rods or plates or other devices 29 are mounted under the flexible belt 14 to extend substantially across the width of the belt 14. These telescoping rods or plates or other devices 29 are supported by being secured to the belt guides 20 and upper track rod 15 in a bridging relation. In use, as the belt guides 20 are caused to move relative to the upper track rod 15, the plates 29 follow such movement so as to open or close on each other.

Alternatively, the flexible belt can be made of a metal in the fashion of a door hinge with the hinge on the underside of the belt. Such a metal belt will flex around the belt guides and will be self-supporting between the belt guides over the upper track rod.

Referring to FIGS. 7 and 8, in order to convey a load from one horizontal plane to another, an escalator section can be incorporated into the conveyor system to provide for such movement. The conveyor system includes a conveyor 30 which is constructed with a horizontal segment 31 and an inclined segment 32 to direct a conveying mechanism 13', as above, in an endless path. As the conveying mechanism 13' is identical to the above, primed reference numerals are used to indicate like parts. The horizontal segment 31 is constructed in a manner similar to the horizontally disposed conveyor 10 described above in order to convey a load in a horizontal plane. However, instead of two pairs of guide tracks, the horizontal segment has three pairs of guide tracks 33, 34, 35. The upper guide tracks 34 and lower guide tracks 35 are constructed in similar manner as above to receive the rollered ends of the upper and lower track rods 15', 17' of the conveying mechanism 13'. The third pair of guide tracks 33 which are parallel to and in the same horizontal plane as the upper guide tracks 34 (FIG. 9) receive the rollered ends of the belt guides 20'. The inclined segment 32 is constructed in similar fashion from extensions of the guide tracks 33, 34, 35 with the upper and lower guide tracks 34, 35 being spaced apart in parallel relation to form one end of the endless loop of the conveyor. The third pair of guide tracks 33 guiding the belt guides 20', however, diverge from the plane of the upper guide tracks 34 into a parallel plane situated between the upper and lower guide tracks 34, 35.

In addition to a drive mechanism as above utilizing a pair of rollers at the ends of the conveyor loop to drive the conveying mechanism 13', a pair of endless chain belts 36, 37 or other similar mechanisms are incorporated in the drive mechanism to drive the conveying mechanism 13' through the inclined segment 32 in a manner so as to form steps. One chain belt 36 (FIG. 8) is disposed immediately below the guide tracks 33 for the belt guides 20' in parallel relation and includes a plurality of spaced pushers 37 for abutting and driving the belt guides 20' (see FIG. 9). Preferably, a chain belt is provided at both ends of the belt guides 20' to assure uniform movement of the belt guides 20'. The chain belt 36 is driven by a sprocket 38 at one end which in turn is driven from the motor (not shown) of the conveyor through a suitable transmission. The chain belt 36 operates at a higher speed than the speed of the conveyor mechanism 13' so as to advance the belt guides 20' at a slightly faster rate. The difference in speed of the chain belt 36 and conveying mechanism 13' is such as to move the forward belt guide 20' of one repeating section as close as possible to the upper track rod 15' of the forward repeating section at the point where the guide tracks 33, 34 diverge.

The second chain belt 37 is mounted immediately below the lower guide tracks 35 in parallel relation and includes a plurality of spaced pushers 39 for abutting and driving the lower track rod 17'. The chain belt 37 is driven by a sprocket 40 at one end driven, for example, from the transmission driving the sprocket 38 of the other chain belt 36. The speed of the chain belt 37 driving the lower track rods 17' is the same as the speed of the chain belt 36 driving the belt guides 20' such that the relative positions of the various rods 15', 17', 20' of the conveying mechanism 13' are retained in passing through the inclined segment 32 of the conveyor 30.

The guide tracks 33 are spaced from the upper guide tracks 34 so as to maintain the forward belt guide 20' in the same horizontal plane as the upper track rod 15' of each repeating section of the conveying mechanism 13' during movement through the inclined segment 32. Also, the rear belt guide 20' of each repeating section is maintained substantially vertically under the upper track rod 15. In this manner, the flexible belt 14 is contoured to have a horizontal tread section 41 and a substantially vertical section 42.

In use, with the conveyor 30 having the conveying mechanism 13' moving from left to right as viewed in FIG. 7, a load is conveyed along the horizontal segment 31 on a repeating section. As the belt guides of the repeating section are subsequently accelerated near the end of the horizontal segment, the belt 14 moves forwardly relative to the upper track rod 15' so that the load becomes positioned between the forward belt guide and the upper track rod immediately behind. Upon entering the inclined segment 32, the repeating section is formed into a step with the load resting on the horizontal tread section 41 of the belt. The load is then carried upwardly and delivered to a suitable takeout station at the end of the inclined segment 32. The conveying mechanism 13' is then recycled as above.

The invention thus provides a conveying system which is capable of moving loads at a relatively high speed between spaced stations while smoothly accelerating and decelerating the loads to and from the high speed. The conveyor utilized by the system is of the pieced continuous type in the horizontal plane such as to present a substantially continuous floor so that foreign matter, dirt or, in the case of passengers, heels, are substantially prevented from being trapped in any crevasses in the floor. In providing this continuous floor, the spring-mounted belt-retaining rods either store or pay out the belt in a vertical plane during movement of the conveying mechanism.

It is noted that the guide tracks of the conveyor can be laid out so that a conveyor can have as many consecutive horizontal and inclined segments as needed to move goods to different horizontal planes. Also, the guide tracks can be laid out as to have more than one transition zone for acceleration or deceleration.

Further, it is noted that for a relatively long conveying system, supplemental drive mechanisms can be added along the path. Such supplemental drive mechanisms would be driven in synchronism with the speed of each related to each other by the geometry of the system at the points of engagement.

The flexible belt which is described above can be of any material which can flex downward, such as, rubber, plastic, carpet, metal mesh, hinged metal plate.

The conveyor of the invention can be advantageously used in many instances. For example, the conveyor can be used as a moving sidewalk onto which passengers can step at a slow conveyor speed, travel through a smooth acceleration to maximum speed for the major portion of the traveling, and then through a smooth deceleration to a slow conveyor speed at which the passengers can step off. Additionally, the conveyor can be used with known conveyors of the constant speed type in various systems. For example, in a system having a constant speed conveyor running at a high speed a conveyor according to the invention can be used to accelerate a load or passenger up to the speed of the high speed conveyor for transfer onto the high speed conveyor. In such a system, the conveyor of the invention can be made with only one divergent zone and one convergent zone so that a load or passenger can transfer from within the faster moving convergent zone onto a parallel high speed conveyor. A second similar conveyor according to the invention can also be used at the opposite end of the high-speed conveyor, or series of high-speed conveyors, to decelerate the load or passenger in a smooth manner. Also, in conveying goods upwardly or downwardly through various inclined planes, the conveyor can transport the goods without special locking devices for holding the goods in place.

Also, as the conveyor transports a load from one station to another without relative movement of the load to the conveying mechanism, no further equipment is necessary to move the load from one position to another position during transportation.

The conveyor system of the invention permits the construction of a conveyor within relatively narrow space requirements with simple and economical construction techniques. Further, as the drive speed in the horizontal segments of the conveyor is constant there is no need to use motors which must change speed during acceleration or deceleration of the conveying mechanism. Still further, the simplicity in the construction of the conveying system reduces the need for costly and continuous maintenance.

Having thus described the invention it is not intended that it be so limited as changes may be readily made therein without departing from the scope of the invention. Accordingly, it is intended that the subject matter described above and shown in the drawings be interpreted as illustrative and not in a limiting sense.

I claim:

1. A conveyor system for moving a load from one station to another comprising:
   a plurality of guide tracks disposed in spaced relation to define an endless path having at least one intermediate section wherein said tracks are disposed in closer vertical relation than in the remainder of said path;
   a conveying mechanism mounted between said tracks for movement through said endless path, said conveying mechanism including a plurality of interconnected vertically and horizontally variable repeating sections and a flexible belt for supporting a load thereon disposed over each repeating section; and
   a drive means connected to said conveying mechanism for driving said conveying mechanism at a constant drive speed through said endless path whereby upon passage through said intermediate section of said endless path said conveying mechanism is moved at a higher speed than in said remainder of said path.

2. A conveyor system for moving a load from one station to another comprising:
   a plurality of guide tracks disposed in spaced relation to define an endless path having at least one intermediate section wherein said tracks are disposed in closer vertical relation than in the remainder of said path;
   a conveying mechanism mounted between said tracks for movement through said endless path, said conveying mechanism including a plurality of interconnected vertically and horizontally variable repeating sections and a flexible belt disposed over each repeating section, said flexible belt being continuous and including a plurality of horizontal stretches disposed over each repeating section and a plurality of vertical loops disposed between adjacent repeating sections, said repeating sections having means therein for adjusting the vertical extent of said vertical loops in response to horizontal elongation of said repeating sections in passing through said endless path; and
   a drive means connected to said conveying mechanism for driving said conveying mechanism at a constant drive speed through said endless path whereby upon passage through said intermediate section of said endless path said conveying mechanism is moved at a higher speed than in said remainder of said path.

3. A conveyor system for moving a load from one station to another comprising:
   a plurality of guide tracks disposed in spaced relation to define an endless path having at least one intermediate section wherein said tracks are disposed in closer vertical relation than in the remainder of said path;
   a conveying mechanism mounted between said tracks for movement through said endless path, said conveying mechanism including a plurality of interconnected vertically and horizontally variable repeating sections and a flexible belt disposed over each repeating section, each flexible belt having an intermediate horizontal stretch disposed over a repeating section and a pair of ends vertically disposed to said horizontal stretch, each repeating section including belt-retaining means secured to each respective end of said belt for adjusting the vertical length of said ends in response to movement of said conveying mechanism in said endless path; and
   a drive means connected to said conveying mechanism for driving said conveying mechanism at a constant drive speed through said endless path whereby upon passage through said intermediate section of said endless path said conveying mechanism is moved at a higher speed than in said remainder of said path.

4. A conveyor system as set forth in claim 3 wherein said belt-retaining means is spring biased in a direction inwardly of said guide tracks.

5. A conveyor of endless loop construction comprising:
   a plurality of guide tracks disposed in spaced relation to define an endless path having at least one convergent zone wherein said guide tracks are disposed in close relationships, a pair of divergent zones on opposite sides of said convergent zone wherein said guide tracks are disposed in greater spaced relationship than in said convergent zone, and at least one transition zone between each divergent zone and said convergent zone wherein said guide tracks join said zones together;
   a conveying mechanism mounted between said guide tracks for movement through said endless path, said conveying mechanism including a plurality of interconnected vertically and horizontally variable repeating sections and a flexible belt for supporting a load thereon disposed over each repeating section; and
   a drive means operatively connected to said conveying mechanism for driving said conveying mechanism through said endless path at a constant drive speed whereby said conveying mechanism accelerates in passing through one of said transition zones and decelerates in passing through the other of said transition zones.

6. A conveyor as set forth in claim 5 wherein said guide tracks include a pair of parallel coplanar upper guide tracks and a pair of parallel coplanar lower guide tracks defining a horizontally disposed endless path.

7. A conveyor as set forth in claim 5 wherein said guide tracks further define an endless path having a horizontal segment and a vertically inclined segment, said guide tracks including a pair of upper guide tracks and a pair of lower guide tracks disposed in substantially parallel relation in said horizontal and inclined segments and a third pair of guide tracks disposed in parallel coplanar relation to said upper guide tracks in said horizontal segment and in parallel vertically spaced relation to said upper guide tracks in said inclined segment; and wherein said repeating sections include means for contouring said flexible belt thereon into a horizontal tread section for carrying a load thereon and a downwardly inclined section within said inclined segment of said endless path.

8. A conveyor as set forth in claim 7 wherein said means for contouring said flexible belt includes a pair of belt guides disposed across said belt in said third pair of tracks, an upper track rod disposed in said upper guide tracks, a pair of lower track rods disposed in said lower guide tracks a fixed distance from said upper track rod, and belt-retaining means mounted on said lower track rods in engagement with said flexible belt to pull said belt taut over said belt guides and upper track rod to form the horizontal tread between one of said belt guides and said upper track rod.

9. A conveyor as set forth in claim 8 wherein said drive means includes a first driven endless chain adjacent said third pair of guide tracks in abutting relation with said belt guides for driving said belt guides at a slightly greater speed than said conveying mechanism in said horizontal segment and a second driven endless chain adjacent said lower guide tracks in said inclined segment for driving said lower track rods in said inclined segment at the same speed as the belt guides in said inclined segment.

10. A conveyor as set forth in claim 8 wherein said belt guides are freely mounted in said third pair of tracks to center over said lower track rods.

11. A conveyor as set forth in claim 8 wherein each said belt-retaining means is spring mounted on a respective lower track rod.

12. A conveyor as set forth in claim 8 wherein each said retaining means of an adjacent repeating section includes a rod spring mounted on and over a respective lower track rod.

13. A conveyor as set forth in claim 8 wherein said conveying mechanism includes a plurality of telescoping means connected between said upper track rod and each said belt guide and under said belt of each repeating section for supporting a load on said belt.

14. A conveyor of endless loop construction comprising:
a plurality of guide tracks including a pair of parallel coplanar upper guide tracks and a pair of parallel coplanar lower guide tracks defining a horizontally disposed endless path, said guide tracks being disposed in spaced relation to define an endless path having at least one convergent zone wherein said guide tracks are disposed in close relationship, a pair of divergent zones on opposite sides of said convergent zone wherein said guide tracks are disposed in greater spaced relationship than in said convergent zone, and at least one transition zone between each divergent zone and said convergent zone wherein said guide tracks join said zones together;
a conveying mechanism mounted between said guide tracks for movement through said endless path, said conveying mechanism including a plurality of interconnected vertically and horizontally variable repeating sections and a flexible belt disposed over each repeating section each repeating section including a pair of lower track rods movably mounted in said lower guide tracks, an upper track rod movably mounted in said upper guide tracks, a pair of hypothenuse rods of fixed length on each side of said conveying mechanism pivotally connected between said upper track rod and a respective lower track rod, a pair of belt guides movably mounted in said upper guide tracks on opposite sides of said upper track rod supporting a horizontal length of said flexible belt therebetween, and a belt-retaining means secured to each lower track rod engaging said flexible belt below a respective belt guide, said belt-retaining means being biased in a direction towards said lower track rod whereby upon movement of said conveying mechanism through each transition zone, said hypothenuse rods pivot with respect to said track rods to vary the vertical height and horizontal length of each repeating section while the horizontal length of said flexible belt is varied to maintain a substantially continuous floor from one repeating section to the next; and
a drive means operatively connected to said conveying mechanism for driving said conveying mechanism through said endless path at a constant drive speed whereby said conveying mechanism accelerates in passing through one of said transition zones and decelerates in passing through the other of said transition zones.

15. A conveyor as set forth in claim 14 further comprising a comb positioned between adjacent belt guides of adjacent repeating sections for overlying the space therebetween.

16. A conveyor of endless loop construction comprising:
a pair of upper guide tracks disposed in an endless loop;
a pair of lower guide tracks disposed within said upper guide tracks to define an endless path, said lower tracks being spaced from said upper tracks in the upper reach of said path to define a pair of divergent zones having said upper and lower tracks spaced far apart, a convergent zone between said divergent having said upper and lower tracks spaced close together, and a pair of transition zones between said convergent zone and a respective divergent zone having said lower tracks sloped with respect to said upper tracks;
a conveying mechanism disposed in said upper and lower tracks to completely fill said endless path, said conveying mechanism including a plurality of interconnecting collapsible repeating sections and a belt disposed over each repeating section to form a plurality of horizontal stretches over said repeating sections and a plurality of vertical loops between adjacent repeating sections, said loops being in engagement at the lowermost ends thereof with said repeating sections; and
a drive means connected to said conveying mechanism for driving said conveying mechanism through said endless path whereby upon movement through each said transition zone said repeating sections collapse and change speed at a smooth rate while said horizontal stretches of said belt vary in length and speed to maintain a substantially continuous floor between adjacent repeating sections during acceleration and deceleration.

17. A conveyor as set forth in claim 16 wherein said lower guide tracks slope at a constant angle with respect to said upper guide tracks in each said transition zone.

18. A conveyor as set forth in claim 16 wherein said drive means is connected to said conveying mechanism to drive said conveying mechanism at a constant rate.

19. A conveyor as set forth in claim 16 further comprising a comb means in said conveying mechanism adjacent said upper guide tracks between adjacent repeating sections for closing the space therebetween.

20. A conveyor as set forth in claim 16 wherein said drive means includes at least one roller along said endless path, said roller having a plurality of equispaced pushers thereon for abutting successive repeating sections of said conveying mechanism.

21. A conveyor comprising:
a plurality of guide tracks disposed in spaced relation to define an endless path having a horizontal segment and an inclined segment, said guide tracks including at least one upper guide track and at least one lower guide track in parallel relation, and at least a third guide track parallel to and coplanar with said guide track in said horizontal segment and parallel to and spaced between said upper and lower guide tracks in said inclined segment;
a conveying mechanism mounted in said guide tracks for movement through said endless path, said conveying mechanism including a plurality of interconnected repeating sections and flexible belt over each repeating section defining a plurality of horizontal stretches over said repeating sections and a plurality of vertical loops between adjacent repeating sections, each repeating section including a pair of spaced lower track rods in said lower guide track, an upper track rod in said upper guide track, a pair of hypothenuse rods connected between said upper and lower track rods, a pair of belt guides mounted on opposite sides of said upper track rod in said third guide track for guiding said belt thereover, and belt-retaining means in engagement with each vertical loop for adjusting the length of said vertical loop; and
a drive means connected to said conveying mechanism for driving said conveying mechanism through said endless path, said drive means including a first means parallel to said third guide track in said horizontal and inclined segments for engaging and driving said belt guides at a higher speed than said conveying mechanism and a second means parallel to said lower guide track for engaging and driving said lower track rods at the same speed as said belt guides in said inclined segment whereby said conveying mechanism is contoured in a steplike manner in passing through said inclined segment to form said belt into a horizontal tread between a belt guide and the upper track rod of each repeating section.

22. A conveyor as set forth in claim 21 wherein said plurality of tracks include a pair of coplanar parallel upper guide tracks, a pair of coplanar parallel lower guide tracks and a pair of parallel third guide tracks.

23. A conveyor as set forth in claim 21 wherein said first means and said second means each include an endless chain belt in abutment with said respective belt guides and lower track rods.